Dec. 1, 1970   H. R. ROTTMANN   3,544,191

OPTICAL FIBER FOCUSING DEVICE FOR OPTICAL INSTRUMENTS

Filed Nov. 21, 1968

INVENTORS
HANS R. ROTTMANN

BY
J. B. Kraft
ATTORNEY

United States Patent Office 3,544,191
Patented Dec. 1, 1970

3,544,191
OPTICAL FIBER FOCUSING DEVICE FOR OPTICAL INSTRUMENTS
Hans R. Rottmann, Poughkeepsie, N.Y., assignor to International Business Machines Corporation, Armonk, N.Y., a corporation of New York
Filed Nov. 21, 1968, Ser. No. 777,788
Int. Cl. G02b 21/00
U.S. Cl. 350—8     11 Claims

ABSTRACT OF THE DISCLOSURE

A focus range selection device for optical instruments which compensates for axial displacements in the position of the object. A number of fiber optics bundles of different length adjust the position of the image of said object by translating the image into focus range of the optical instrument.

BACKGROUND OF THE INVENTION

Field of the invention

This invention relates to a focus range selection device for optical instruments and, more particularly, to a focus range selection device which uses stepped bundles of light-conducting fibers for translating the images into focus range of the optical instruments.

Description of the prior art

It is well known that in an optical instrument, the axial distance from the lens system (image distance) at which the image of an object is formed depends upon the characteristics of the lens system and upon the axial distance of the object from the lens system (object distance). When in a given instrument the object distance varies, the image distance varies accordingly. If the image goes out of the depth of focus of the instrument, the image becomes blurred. To bring the image into focus range, a focus adjustment is then required. In the conventional optical instruments, this adjustment is accomplished by axially displacing part of the system. In a telescope or microscope, for example, this adjustment is usually achieved by axial sliding of the combination objective and eyepiece or by axially sliding the eyepiece alone.

Although the adjustment obtained by axially moving the instrument or part of it is suitable for many applications, in some instances it is undesirable. For example, it may introduce unwanted vibrations or lateral misalignments of the optical instruments with respect to the objects. Axial movements of part of the instrument, for instance, are often undesirable in microelectronic art where it is frequently necessary to examine specimen objects under a microscope which must be maintained in a precise lateral alignment relative to the optical axis during the course of the inspection.

It is well know that the optical instruments have inherent limitations in focusing images which are not within the depth of field. These limitations are a drawback in the instruments which are used for comparison or alignment of two or more objects. In this type of instrument, the object planes often are axially displaced by an amount greater than the depth of field of the instrument and consequently, blurring of one or more images result.

The prior art has not offered satisfactory solutions to these drawbacks.

Accordingly, it is a primary object of the present invention to focus an optical instrument without the necessity for axial displacement of any lens.

Another object of this invention is to focus simultaneously articles disposed in different planes, which planes are spaced from each other by a distance greater than the depth of field of the optical instrument.

Still another object of this invention is to permit focusing in an optical instrument without adversely affecting the relative alignment and spacing between the elements of the optical instrument and the article to be observed.

Another object of this invention is to focus rapidly and sequentially articles which are located in different object planes without adversely affecting the relative alignment and spacing between the elements of the optical instrument and the articles to be observed.

A further object of this invention is to focus rapidly and sequentially articles which are located in different object planes, where said planes are spaced by a distance which is greater than the depth of field of the optical instrument, without adversely affecting the relative alignment and spacing between the elements of the optical instrument and the articles to be observed.

Another object of this invention is to focus an optical instrument simply and with a minimum of necessary hardware.

SUMMARY OF THE INVENTION

In accordance with one aspect of the invention, a focus range selection device is provided which translates the intermediate images of the objects from the planes in which they are formed to a common plane which is within focus range of the viewing arrangement. These image translating means can be a number of fiber optical bundles having the fibers substantially parallel to the optical axis of the instrument. The fibers transmit the image from the entrance surface of the bundles to the exit surface of the bundles. Bundles of different lengths are provided to compensate for axial displacement in the position of the images.

In accordance with another aspect of the invention, the fiber optics bundles are selectively inserted into the optical path of the instrument. The exit surface of each bundle is in the same plane which is within focus range of the viewing arrangement. Because the bundles are of different length, the position of the entrance surface along the optical path length will vary. Consequently, objects at different object distance will be focused correctly by selecting a bundle of suitable length, since the fiber bundles will translate all the images to the exit surface of the bundle. If the fiber bundles are sequentially inserted into the instrument at a sufficiently high frequency, the image of a plurality of objects will appear simultaneously in an human eye, due to the persistence of vision.

The foregoing and other objects, features and advantages of the invention will be apparent from the following more particular description and preferred embodiments of the invention as illustrated in the accompanying drawings.

DESCRIPTION OF THE PREFERRED EMBODIMENTS

Figure 1:
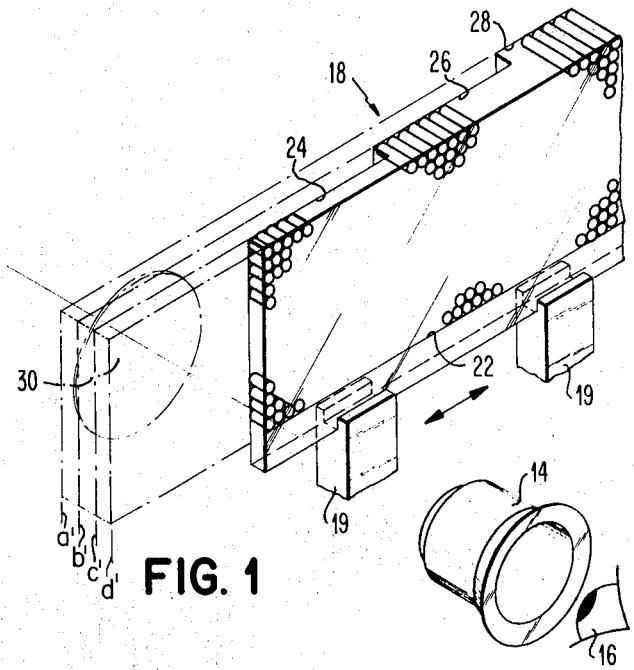
FIG. 1 is a schematic perspective view of a microscope embodying a stepped plate of glass fibers in accordance with the principles of the present invention.

Before going into the description of the preferred embodiments of the invention, a brief review of the basic principles of operation and properties of fiber optics, as well as of the optical instruments in which they are embodied, is deemed useful.

Smooth rods or fibers of transparent dielectric material such as glass can transmit light by means of multiple total internal reflections along their side walls, so that the light impinging on one end thereof will appear at the other end. Individual fibers can be brought together to form a bundle in which each individual fiber conducts the light independently. The term bundles, as used in this specification, is intended to include any structure having optical fibers arranged in any parallel relationship, such as plates of parallel fibers. The bundles can be manufactured in such a manner as to have the ends of each fiber orderly located so that when an image is formed on the entrance face of the bundle, the image is dissected into as many components as there are fibers in the bundle, and a mosaic of the image is reassembled and appears on the exit face of the bundle. In this way, bundles of fibers are able to transmit an image from one location to another. The best performances in the image transmission today are afforded by bundles of multi-fibers of the so-called double-coated type. An explanation of the structure and operation of these image carriers is not deemed necessary for the understanding of the present invention, and the interested reader can find more detailed descriptions in optics publications and books.

The general purpose of optical instruments is to form an image of an object by means of lenses. An image is called "real" when the rays of light emerging from the system converge to points which may be received on a screen; an image is called "virtual" when the rays issuing from the system are not accessible to a screen. The present invention is particularly useful to translate a "real" image from one surface to another surface. The invention will be hereinafter described as embodied in microscopes, but it will be apparent to those skilled in the art that it can be easily embodied in every instrument which at some stage or other is concerned with the formation of a "real" image.

A microscope is a magnifying instrument which allows the observation of small object specimens. A microscope is basically constituted by an objective lens and an eye-piece lens. A proper illumination system and several controls are also commonly present in the microscopes used today. The objective is located close to the object to be observed and forms an enlarged, real and intermediate image of the object; this image is then viewed with the eyepiece which forms the virtual image which is received by the observer's eye. The intermediate image is located at an axial distance from the objective which depends upon the axial distance of the object from the objective and on the focal length of the objective. In order to have a clear vision of the image, the eyepiece must be located at a proper distance from the intermediate image formed by the objective. In other words, the eyepiece must be focused on the image formed by the objective. When the distance between the object specimen and the objective is changed, the distance between the objective and the images changes accordingly, and if no adjustment of the eyepiece distance is made, the image viewed through the eyepiece can become blurred. There is a certain axial range in which the object can be moved, while still remaining substantially focused; this range is called "depth of field." A corresponding range exists in the position of the image, in which the image remains substantially focused; this second range is called "depth of focus." Obviously, the depth of field and the depth of focus are closely related, depending upon the same phenomenon. Generally, the depth of field and the depth of focus of a microscope are rather limited so that when objects at different object distances must be observed, adjustments of the focus of the apparatus are required. In the known apparatus, these adjustments are commonly accomplished by sliding the tube or barrel which supports the objective and eyepiece or by sliding the eyepiece alone. However, as set forth above, there are some instances in which this kind of adjustment is undesirable.

Referring now to the drawings, FIG. 1 represents a schematic view of a first embodiment of the invention. Although a microscope is shown, the invention is equally applicable to a telescope or other like instrument. In the microscope shown, an object specimen 10 is optically aligned with objective 12 and eyepiece 14. The observer's eye 16 is shown near eyepiece 14. The object 10 can lie on different object planes which generally are perpendicular to the optical axis 20 of the apparatus. In the drawing, only four planes $a$, $b$, $c$, $d$ have been represented and, for description purposes, it is assumed that the distance between two contiguous planes is equal to the depth of the field of the objective. The images of the specimens positioned with their surfaces lying on the above planes are focused by the objective into planes $a'$, $b'$, $c'$, $d'$. Since the planes $a$, $b$, $c$, and $d$ have been spaced by an amount equal to the depth of field of the objective, the planes $a'$, $b'$, $c'$, and $d'$ result in being spaced by an amount equal to the depth of focus. Although the magnification of the optical microscopes can be several hundred times, for the description of the present invention, a microscope having only a very limited degree of magnification has been represented in the drawing. It is, however, obvious that the invention can be embodied in microscopes having any degree of magnification.

A stepped plate 18 of fiber optics bundles, having its fibers parallel to the optical axis 20 of the microscope, is supported by suitable means, generally indicated by slotted supports 19, so as to be laterally slidable in order that each selected step can be inserted into the ray path. The support means maintain the exit face 22 of plate 18 on plane $d'$ which is in focus range of eyepiece 14. The entrance face 24 of the first step is maintained on plane $c'$; the entrance face 26 of the second step is maintained on plane $b'$; and the entrance face 28 of the third step is maintained on plane $a'$. Although in the drawing there has been shown a plate having only three steps, plates having more steps can be used.

For the purposes of explaining the operation of the apparatus of FIG. 1, let us assume that plate 18 is kept away from the optical path of the microscope (zero length bundle) and that the surface to be observed of specimen 10 lies on plane $d$. The image 30 of the specimen is then formed by objective 12 on plane $d'$, and a clear vision of the object is allowed, since plane $d'$ is in the eyepiece range of focus.

When specimen 10 is moved, its image 30 moves accordingly, and when the surface to be observed of specimen 10 lies on plane $c$, its image will lie on plane $c'$. At this point, a clear vision of the object is no longer possible since eyepiece 14 is still focused on plane $d'$, and plane $c'$ is out of the depth of focus. However, according to the principles of operation of the present invention, a clear image can be obtained by simply sliding plate 18 so as to insert the first step into the ray path. The image is then focused on the entrance face 24 of the first step and, by the properties of the bundles of fiber optics, the image appears on the exit face 22 of the plate. A clear image is then allowed through the eyepiece. In like manner, if the surface of the object lies on plane $b$ or $a$, a clear vision is obtained by inserting in the ray path the second or the third step, respectively.

When the surface of the object lies on a plane intermediate the planes shown in the figure, a clear image can still be obtained. In fact, as set forth above, the distance between two contiguous planes $a'$, $b'$, $c'$, $d'$, and the distance between two contiguous steps of plate 18, has been chosen equal to the depth of focus of the microscope. Therefore, if the image is still not within the focus range, there may always be selected a step on the entrance face of which the image may be focused in order to be transmitted onto plane $d'$ which is within the focus range of the eyepiece.

In a microscope employing a reticle, the position of the reticle element would be at the plane of the intermediate image. Since the reticle element in this position would interfere with the movement of plate 18, instead of using a reticle element in this position, the image of the reticle can be projected onto the plane of the intermediate image. This may be accomplished by any conventional optical means, such as means for projecting a reticle on a beam splitter interposed in the optical path of the microscope between the objective and the plate which, in turn, projects one of the split reticle images onto the plane of the intermediate image. It should be clear that the reticle is not necessary in the practice of the present invention.

Although in the drawing a laterally slideable, stepped plate has been shown, many other embodiments of the invention can be used for focusing a microscope or a like instrument. For example, bundles of fiber optics of different height can be placed in angularly spaced positions of a rotatable plate or turret, so that the selected bundle can be indexed into the optical path to transmit the image into focus range.

Figure 2:
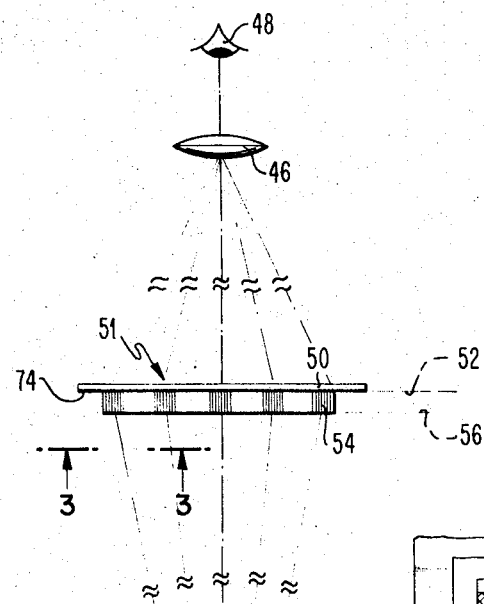
FIG. 2 is a schematic view of another microscope embodying fiber optics bundles in different manner in accordance with the principles of the present invention.

FIG. 2 relates to a second embodiment of the present invention and shows a microscope for simultaneously focusing objects at different object distances. More particularly, the figure shows a microscope used for aligning an object specimen 40 having a flat surface 58, with a partially transparent object specimen 42 having a flat surface 60, by two coordinate shifting means generally indicated by screws 76 and 78. Light rays 80 illuminate the two objects. For example, object specimen 40 could be a semiconductor wafer, and object specimen 42 a glass mask to be precisely aligned with the wafer for the treatment of the semiconductor material in the manufacturing of electronic devices. Marks 70 and 72 to be aligned are present on object 40 and object 42, respectively. The objective of the microscope, schematically represented by lens 44, forms the intermediate image of surface 58 on plane 56 and the image of surface 60 on plane 52. Eyepiece 46 is focused so as to allow an image receiver, generally indicated by eye 48, to receive a clear vision of the images formed on plane 52.

In an ordinary microscope, if the distance between plane 52 and plane 56 is more than the depth of focus, the images of surfaces 58 and 60 cannot be simultaneously observed.

According to the present invention, in the microscope there is inserted a focusing device, generally indicated by reference number 51, consisting of a transparent plate 50 of flat optical quality glass, and a set of square section, ordinately arranged, prismatic elements 54 formed by fiber optic bundles. Plate 50 is supported by means not shown so that its surface 74 lies on plane 52, and elements 54 are arranged on plate 50 so as to form an alternate mosaic or chessboard. This arrangement can be better seen on FIG. 3. Elements 54 have their bottom or entrance surfaces lying on plane 56, and their upper or exit surfaces lying on plane 52. Likely to the steps of plate 18 of FIG. 1, elements 54 transmit to their exit surface the images which are formed on their entrance surface. As a result of this transmission, an alternate focused mosaic of the images of object specimens 40 and 42 is present on plane 52 and therefore can be observed through eyepiece 46.

Figure 3:
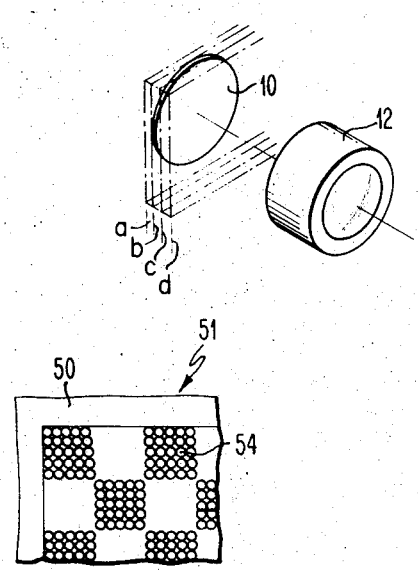
FIG. 3 is an enlarged fragmentary view of the device of FIG. 2 taken in the direction of arrows 3—3.
Figure 4:
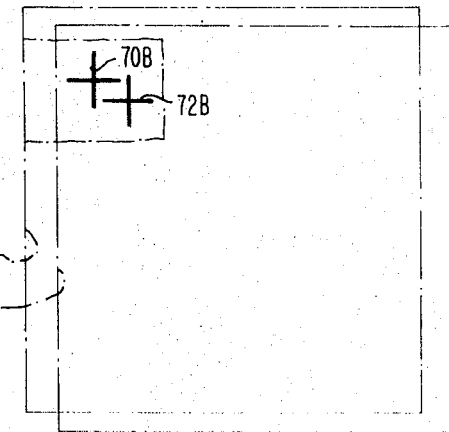
FIG. 4 is an enlarged view of two specimen objects to be aligned under the microscope shown in FIG. 2.
Figure 5:
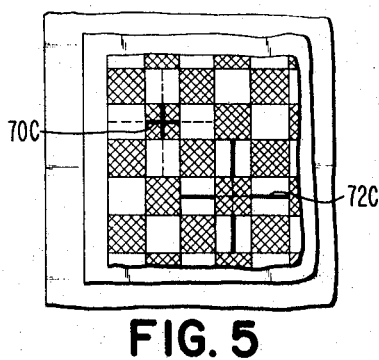
FIG. 5 is a fragmentary view of part of the specimen objects represented in FIG. 4, as viewed through the eyepiece of the microscope of FIG. 2.

The operation of the microscope of FIG. 2 for aligning two objects can be more clearly understood with reference to FIGS. 3 and 4. Let us assume that planes 58B and 60B of FIG. 4 are the surface of objects 40 and 42 as viewed from the top. On these planes there are two cross marks 70B and 72B to be aligned. The cross marks can be observed through the eyepiece as focused on different areas of the bundle chessboard; more particularly, cross mark 72B can be clearly observed in the areas where there are no fiber bundles (zero-length bundles), and cross mark 70B (which was focused on plane 56) can be observed in the areas where there are fiber bundles. In FIG. 5, there is represented how the images of the two cross marks appear through the eyepiece of the microscope. The image of cross mark 70B is represented in 70C, and the image of cross mark 72B is represented in 72C. The continuous lines represent the parts of the cross marks into focus, and the dotted lines represent the parts of the cross marks out of focus. It is evident that by moving object specimen 58B under microscope observation, the two object specimens 58B and 60B can be easily aligned.

Although in the embodiment illustrated in FIG. 2 all the fiber bundles have the same height, bundles of 3 or more different heights can be used to extend the depth of field of the microscope so as to focus 3 or more specimens at different object distances. It is also evident that, although in the drawings the bundles have been shown disposed as a chessboard, any other alternate arrangement can be used, as well as any appropriate bearing medium different from glass plate 50.

According to a further embodiment of the invention, the fiber optic bundles of FIGS. 1 and 2, instead of remaining stationary during the observation, can be alternatively swept back and forth, so as to allow a subsequent focusing of the images of the object specimens positioned at different object distances. If the frequency of sweeping is higher than the persistence of the images in the human eye, the observer will receive a distinct and clear image of the object specimens.

While the invention has been particularly shown and described with reference to preferred embodiments thereof, it will be understood by those skilled in the art that various changes in form and in details may be made therein without departing from the spirit and scope of the invention.

What is claimed is:
1. An optical instrument comprising:
   a lens for producing an image of an object;
   image receiving means for receiving the image produced by said lens; and
   a focus range selection device positioned between said lens and said image receiving means, said focus range selection device including:
      a group of image transmitting fiber optics bundles, each of said bundles having a flat image entrance surface and a flat image exit surface, said flat image entrance surface of each of said fiber optics bundles being in different planes, and
      supporting means for supporting at least one of said bundles in the optical path of the optical instrument with the image entrance surface of the bundle in focus range of the object image produced by said lens, and with the image exit surface of the bundle in focus range of said image receiving means.

2. A microscope for producing an enlarged image of an object specimen positionable at different object distances comprising:
an objective lens for producing an image of an object;
an eyepiece lens for receiving the image produced by said objective lens; and
a focus range selection device positioned between said objective lens and said eyepiece lens, said focus range selection device including:
a group of image transmitting fiber optics bundles, each of said bundles having a flat image entrance surface and a flat image exit surface, said image entrance surface of each of said bundles being in a different plane, and
supporting means for supporting a selected one of said bundles in the optical path of the microscope with the image entrance surface of the selected bundle in focus range of the image produced by said objective lens, and with the image exit surface of the selected bundle in focus range of said eyepiece lens.

3. A microscope for producing enlarged images of object specimens positioned at different object distances comprising:
an objective lens for producing images of said object specimens;
an eyepiece lens for receiving the images produced by said objective lens; and
a focus range selection device positioned between said objective lens and said eyepiece lens, said focus range selection device including:
a group of image transmitting fiber optic bundles, each of said bundles having a flat image entrance surface and a flat image exit surface, and
supporting means for supporting more than one of said bundles in the optical path of the microscope with the image entrance surface of each bundle in focus range of one of the images produced by said objective lens, and with the image exit surface of each of said bundles in focus range of the eyepiece lens.

4. A microscope according to claim 2 wherein the image entrance surfaces and the image exit surfaces of the bundles inserted in the optical path are maintained substantially perpendicular to the optical axis of the microscope.

5. A microscope according to claim 3 wherein the image entrance surfaces and the image exist surfaces of the bundles inserted in the optical path are maintained substantially perpendicular to the optical axis of the microscope.

6. A microscope according to claim 2 wherein said image entrance surface planes of said fiber optics bundles are spaced by an amount equal to the depth of focus of the microscope.

7. A microscope according to claim 3 wherein said image entrance surface planes of said fiber optics bundles are spaced by an amount equal to the depth of focus of the microscope.

8. A microscope according to claim 4 wherein said image entrance surface planes of said fiber optics bundles are spaced by an amount equal to the depth of focus of the microscope.

9. A microscope according to claim 3 wherein said bundles having different image entrance surface planes are sequentially inserted into the optical path so as to sequentially bring into focus range of the eyepiece lens the images of the object specimens positioned at different object distances.

10. A microscope according to claim 4 wherein said bundles having different image entrance surface planes are sequentially inserted into the optical path so as to sequentially bring into focus range of the eyepiece lens the images of the object specimens positioned at different object distances.

11. A microscope according to claim 5 wherein said bundles of different image entrance surface planes are sequentially inserted into the optical path so as to sequentially bring into focus range of the eyepiece lens the images of the object specimens positioned at different object distances.

References Cited
UNITED STATES PATENTS

| | | | |
|---|---|---|---|
| 3,068,772 | 12/1962 | MacNeille | 350—96 X |
| 3,187,627 | 6/1965 | Kapany | 350—8 |
| 3,356,854 | 12/1967 | Humphrey | 350—960 UX |

DAVID SCHONBERG, Primary Examiner

T. H. KUSMER, Assistant Examiner

U.S. Cl. X.R.

350—54, 96